United States Patent [19]

Tran et al.

[11] Patent Number: 4,901,951
[45] Date of Patent: Feb. 20, 1990

[54] YAW FIN DEPLOYMENT APPARATUS FOR EJECTION SEAT

[75] Inventors: Anthony T. Tran, Gaithersburg, Md.; Chi R. Tung, Plymouth Meeting; Peter W. Yost, Telford, both of Pa.

[73] Assignee: United States of America as represented by the Secretary of the Navy, Washington, D.C.

[21] Appl. No.: 215,139

[22] Filed: Jul. 5, 1988

[51] Int. Cl.⁴ .............................................. B64D 25/10
[52] U.S. Cl. .................................. 244/122 A; 244/141
[58] Field of Search ........ 244/122 A, 122 R, 122 AE, 244/140, 141, 122 AH, 49, 3.28, 3.29; 180/272; 24/115 F, 546

[56] References Cited

U.S. PATENT DOCUMENTS

| | | | |
|---|---|---|---|
| 3,679,157 | 7/1972 | Roberts et al. | 244/122 A |
| 4,470,565 | 9/1984 | Zenobi et al. | 244/122 A |
| 4,480,806 | 11/1984 | Duncan | 244/122 A |

*Primary Examiner*—Sherman D. Basinger
*Assistant Examiner*—Anne Sartelle
*Attorney, Agent, or Firm*—Susan E. Verona; James B. Bechtel; James V. Tura

[57] ABSTRACT

A yaw fin deployment apparatus provides a continuous depolyment force to the fin during the entire range of deployment. A shaft, a movable sleeve bearing for riding along the shaft, a strut connected between the sleeve bearing and the fin, and a lanyard for continuously pulling the sleeve bearing along the shaft are provided. The momentum created when the ejection seat separates from the aircraft is transmitted to the lanyard, to the sleeve bearing, and to the strut for deploying the fin. A pulley is attached to the seat and is located near the aft end of the shaft and guides the lanyard to assure that the actuation force exerted on the sleeve bearing is in a direction parallel to the axis of the shaft. When the fin is fully deployed, the lanyard separates from the sleeve bearing through a split ring at the bottom of the sleeve bearing. A primary spring-loaded latch located at the aft end of the shaft locks the fin in a fully deployed position. A secondary spring-loaded latch located between the aft end and the fore end of the shaft prevents a partially deployed fin from returning to the stowed position. An energy attenuating cone-shaped bushing is located at the aft end of the shaft supplies a continuous and gradually increasing braking resistance for the sleeve bearing to bring it to a halt when the fin is fully deployed.

12 Claims, 2 Drawing Sheets

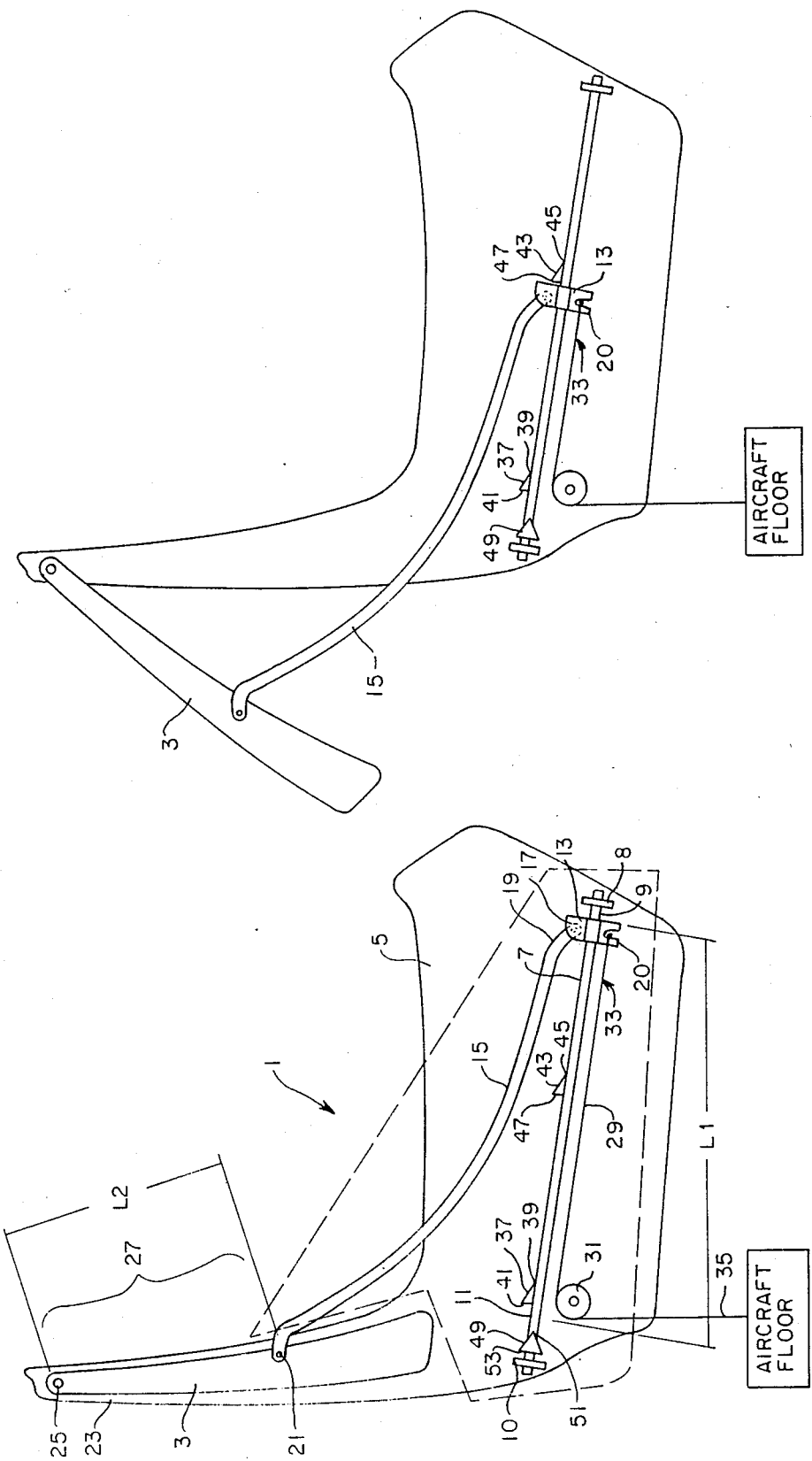

4,901,951

YAW FIN DEPLOYMENT APPARATUS FOR EJECTION SEAT

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention described herein relates to the field of seats for ejecting aviators from aircraft. More specifically, the invention relates to fins deployed on an ejection seat to stabilize the seat with respect to yaw. The invention especially relates to an apparatus for deploying a yaw stabilizing fin for an ejection seat.

An aircraft advanced ejection seat can be equipped with a fin (or fins) that stabilizes against yaw when the seat is ejected and falls through the air. As long as the seat remains in the aircraft, the yaw stabilizing fin need not be deployed or oriented into its yaw stabilizing orientation. Often the fin is folded about a pivot and stowed against the sides of the ejection seat. However, when the seat is ejected, the yaw stabilizing fin is automatically deployed.

The stabilizing yaw fin is generally deployed through a 90 degree angle with respect to the back of the ejection seat. A known apparatus for yaw stabilizing fin deployment has one end of a lanyard connected to the tip of the fin by an open face hook. The other end of the lanyard is attached to the aircraft. The fin is retained in its folded or stowed position by a shear pin rated for a specific shear force, for example, 200 lb.. When the ejection seat is ejected, the lanyard is made taut by the ejection seat's pulling on the lanyard in a direction away from the aircraft, thereby providing a deploying force to a hook at the tip of the fin. To overcome the rating of the shear pin when the fin is deployed, at least 200 lb. of force is applied to the lanyard and initiates deployment of the fin. However, due to the fact that the hook on the fin has an open face, once the fin is oriented at an approximate 15 degree angle with respect to the back of the ejection seat, the lanyard slips off the hook. Since the fin must continue to rotate to 90 degrees to become fully operational, the fin must travel the remaining 75 degrees utilizing the momentum created by the lanyard in the first 15 degrees of deployment.

The fin begins to lose momentum and decelerate as soon as the deploying lanyard slips off the hook, and the fin continues to experience deceleration during deployment from 15 to 90 degrees. Such a fin is subject to deployment failure in instances where the fin experiences a high acceleration load in the direction opposite to that of deployment. It would be desirable to provide a fin deployment mechanism that does not depend upon momemtum experienced by the fin during partial deployment to complete the full deployment of the fin.

The connection of the lanyard to the fin at the fin tip has a disadvantage. High aerodynamic loads can bring about a large frictional force at the fin pivot point and thereby retard or prevent proper deployment of the fin. Therefore, it would be desirable to provide a fin deployment mechanism that does not undergo large frictional forces at a fin pivot point which retard or prevent proper deployment of the fin.

Another problem associated with the known fin deployment mechanism is that only one spring loaded locking pin is provided and is actuated when the fin deploys the full 90 degrees. However, if the fin does not deploy the full 90 degrees, then it could fall back to the stowed position rendering the fin useless as a yaw stabilizing control surface. It would be desirable, therefore, to provide a fin deployment mechanism that prevents a fin from falling back to the stowed position in a case where the fin is only partially deployed.

Other deployment mechanisms for ejection seat stabilizing fins are disclosed in the U.S. Patents. U.S. Pat. Nos. 3,027,124 and 3,662,978 disclose fins deployed by hydraulic cylinders. Hydraulic cylinders are complex and weighty structures, and it would be desirable to provide a fin deployment mechanism that does not utilize hydraulic cylinders.

U.S. Pat. No. 4,470,565 discloses fins deployed by torsion springs located at the pivot points of the fin to the seat. Considering the fact that a large amount of momentum is generated when an ejection seat is ejected from an aircraft, it would be desirable to provide a fin deployment mechanism that utilizes the momentum of an ejected seat without requiring springs to bring about deployment.

U.S. Pat. No. 4,480,806 discloses a stabilizing fin deployed by the force of a moving airstream acting upon the fin. A problem with depending upon a moving airstream for deployment is that an airstream is inconsistent and unreliable. U.S. Pat. No. 4,462,562 discloses deployment of a stabilizing bellows-like afterbody, not a fin, upon ejection of the seat. The folded bellows is unfolded by a lanyard that becomes taut when the seat is ejected from the aircraft.

A common problem present with the known yaw stabilizing fin deployment mechanisms is that none of the known fin deployment devices provides a simple and reliable deployment mechanism that provides a continuous force during the entire range of fin deployment.

Another common problem present with the known yaw stabilizing fin deployment mechanisms is that they lack a locking mechanism that locks a partially deployed fin and prevents a partially deployed fin from returning to the stowed position.

SUMMARY OF THE INVENTION

Accordingly, it is an object of the present invention to provide a simple and reliable deployment mechanism for a yaw stabilizing fin that provides a continuous deployment force during the entire range of fin deployment to counteract opposing aerodynamic forces, friction forces, and acceleration loads on the fin.

Another object of the invention is to provide a fin deployment mechanism that does not depend upon momemtum experienced by the fin only during partial deployment to complete the full deployment of the fin.

Still another object of the invention is to provide a fin deployment mechanism that does not undergo large frictional forces at a fin pivot point which retard or prevent proper deployment of the fin.

Yet another object of the invention is to provide a fin deployment mechanism that prevents a fin from falling back to the stowed position in a case where the fin is only partially deployed.

Another object is to provide a fin deployment mechanism that does not utilize complex and weighty hydraulic cylinders.

Briefly, these and other objects are accomplished by a novel fin deployment apparatus for a yaw stabilization fin attached to an aircraft ejection seat. The deployment apparatus of the invention is characterized by a simple and reliable means for providing a continuous deployment force during the entire range of fin deployment. Preferably, the continuous deployment force means transmits ejection momentum from the seat undergoing ejection to the fin attached to the seat. The ejection momentum is continuously transmitted to the fin throughout the entire range of fin deployment.

With the preferred embodiment of the invention, momentum from an ejecting seat is continuously transmitted through a lanyard to the deploying fin by means of a track, means for following the track, and a strut connected between the track follower and the fin. The continuous nature of fin deployment provides sufficient energy to overcome the large frictional forces at the fin pivot point. Therefore, frictional forces are not able to retard or prevent proper deployment of the fin. Once the fin is nearly fully deployed, the lanyard separates from the track follower.

In a further aspect of the invention, locking means are provided for precluding retraction of the fin after deployment thereof has been initiated. More specifically, primary locking means are provided to prevent a fully deployed fin from returning to the stowed position. Secondary locking means are provided to prevent a partially deployed fin from returning to the stowed position. With the invention, complex and weighty hydraulic cylinders are unnecessary.

In accordance with another aspect of the invention, brake means are provided for attenuating the energy of the deploying fin as the fin nears full deployment.

Other objects, advantages and novel features of the invention will become apparent from the following detailed description of the invention when considered in conjunction with the accompanying drawings herein.

BRIEF DESCRIPTION OF THE DRAWING

In the drawings:

FIG. 1 shows an embodiment of the invention in the stowed position;

FIG. 2 shows the embodiment of FIG. 1 in a partially deployed position;

DESCRIPTION OF THE PREFERRED EMBODIMENT(S)

Figure 3:
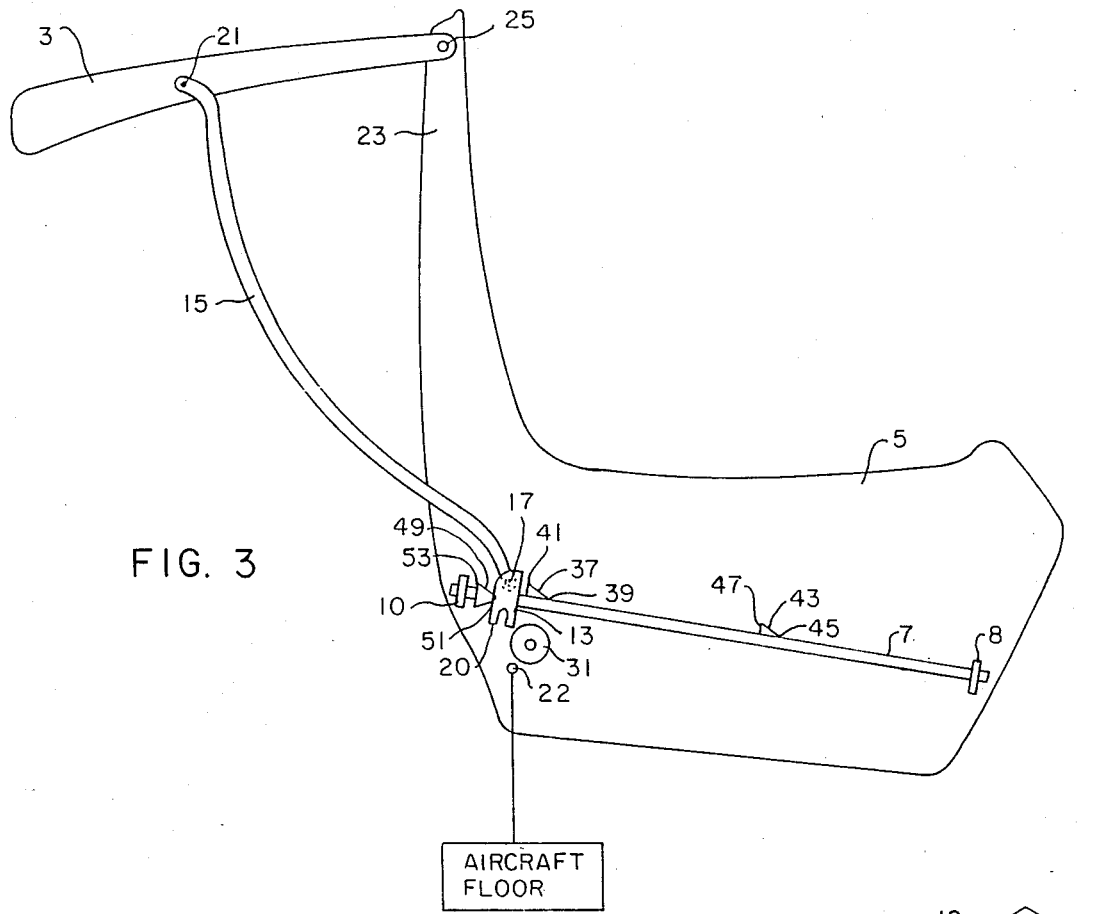
FIG. 3 shows the embodiment of FIG. 1 in the fully deployed position.

With reference to FIG. 1, a fin deployment apparatus 1 for a yaw stabilizing fin 3 attached to an aircraft ejection seat 5 is shown with the fin 3 in the stowed position. The fin deployment apparatus 1 of the invention inherently serves as means 1 for applying a substantially continuous force to the fin 3 during deployment thereof. The continuous deployment force means 1 includes a track 7 (in the form of cylindrical shaft 7 made of aluminum) including a fore end 9 and an aft end 11. The shaft 7 defines a track length L1. The shaft 7 is attached to the ejection seat 5 with shaft holder assemblies 8 and 10. A movable means 13 for following the track 7 (in the form of sleeve bearing 13 made of aluminum) is adapted for riding along the outside of the shaft 7. A means 15 for connecting the fin 3 to the shaft 7 is provided by curved strut 15. Means 17 for connecting the strut 15 to the sleeve bearing 13 are provided in the form of a first pivot pin 17. More specifically, the first pivot pin 17 connects a first end 19 of the strut 15 to the movable sleeve bearing 13. Means 21 for connecting the fin 3 to the strut 15 are provided in the form of second pivot 21.

Figure 4:
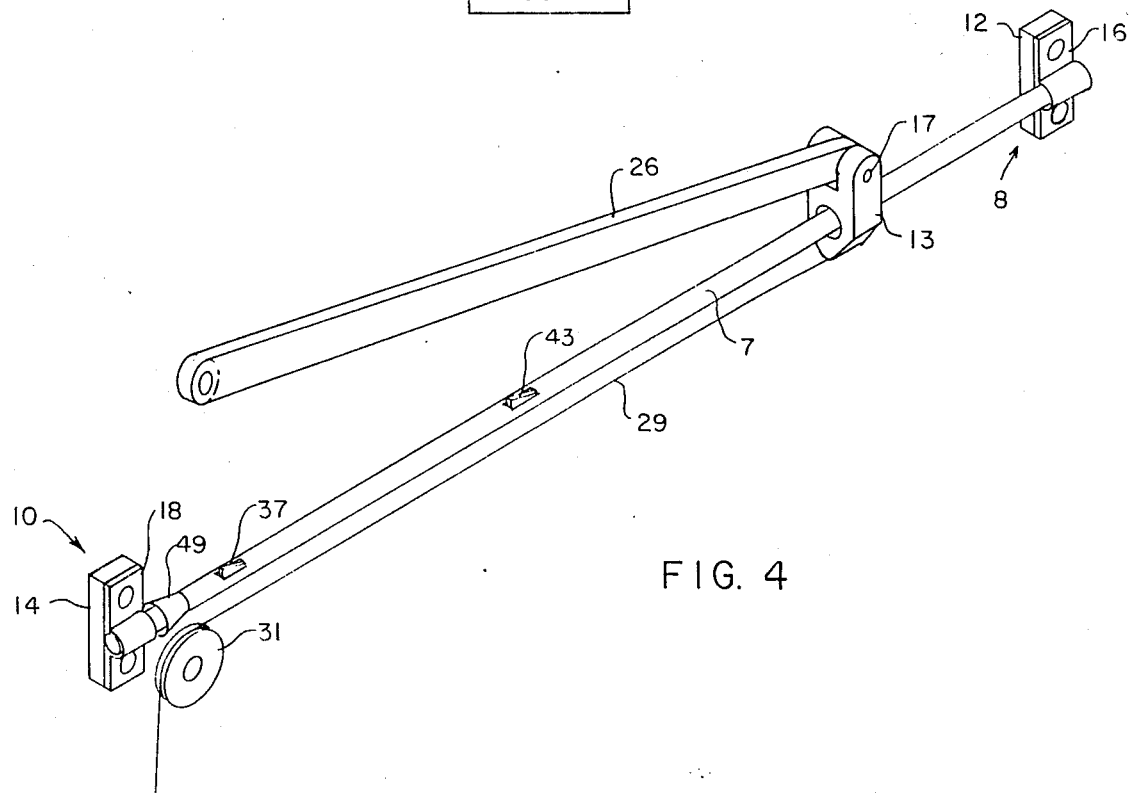
FIG. 4 shows an enlarged view of an alternative embodiment of the invention.

In one embodiment, the shaft holder assemblies 8 and 10 include support blocks 12, 14 and cover plates 16, 18, respectively, as shown in FIG. 4. Apertures are provided in blocks 12, 14 and plates 16, 18 for fasteners such as screws not shown) for fastening the shaft holder assemblies 8 and 10 to the ejection seat 5.

Means 25 for connecting the fin 3 to the seat 5 are provided in the form of a third pivot 25. More specifically, the fin 3 is connected to the upperside panel 23 of the ejection seat 5. The second pivot 21 is located at a position along the fin 3 that is displaced from the third pivot 25 by a distance L2 defining a fin lever arm 27. The fin lever arm 27 is rotatable around the third pivot 25 which serves as a fulcrum for the fin lever arm 27.

Means for continuously moving the sleeve bearing 13 along the shaft 7 are provided in the form of lanyard 29 and guide pulley 31. The lanyard 29 is attached to a part of the aircraft that does not eject along with the ejection seat 5, and the guide pulley 31 is attached to the seat 5. A first end 33 of the lanyard 29 is connected to the sleeve bearing 13. A second end 35 of the lanyard 29 is connected to the aircraft floor. The momentum created when the ejection seat 5 separates from the aircraft is transmitted to the lanyard 29 when the lanyard 29 gets taut when the seat 5 moves away from the aircraft. It is the momentum of the moving seat 5 transmitted through the lanyard 29 that provides a source of actuation force for deploying the fin 3. The pulley 31 serves to guide the lanyard 29 as the lanyard 29 pulls the sleeve bearing 13. The pulley 31 is located near the aft end 11 of the shaft 7, and the pulley 31 provides that the actuation force exerted by the lanyard 29 on the sleeve bearing 13 is in a direction parallel to the axis of the shaft 7. The sleeve bearing 13 is provided with a split ring 20 at the bottom of the bearing 13. Once the fin 3 has reached the fully deployed position as shown in FIG. 3, the lanyard 29 pulls directly downwardly from the sleeve bearing 13. When the lanyard 29 pulls directly downward from the sleeve bearing 13, the end 22 of the lanyard 29 passes through the open split ring 20 and separates from the sleeve bearing 13.

Referring to FIG. 1, locking means are disposed between the fore and aft end 9 and 11 respectively for precluding retraction of the fin 3 after deployment thereof has been initiated. More specifically, primary locking means 37 (in the form of primary spring-loaded latch 37) are located near the aft end 11 of shaft 7 for locking the fin 3 in a fully deployed position. Secondary locking means 43 (in the form of secondary spring-loaded latch 43) are located at a location between the aft end 11 and the fore end 9 of the shaft 7 for preventing a partially deployed fin 3 from returning to a stowed position.

More specifically with respect to the primary locking means 37, the latch 37 is housed inside the shaft 7 and is pivoted with its pivot end 39 facing the fore end 9 of the shaft 7. The latch end 41 of the primary latch 37 faces the aft end 11 of the shaft 7. When the sleeve bearing 13 passes over the primary latch 37 travelling from the fore end 9 to the aft end 11 of the shaft 7, the sleeve bearing 13 presses the latch 37 down into the interior of the shaft 7, thereby enabling the sleeve bearing 13 to pass over the latch 37. Once the sleeve bearing 13 has cleared the latch 37, the spring-loaded latch 37 will pop up out of the shaft 7 interior. In the popped up position, the latch end 41 of the latch 37 prevents the sleeve bearing 13 from moving backward toward the fore end 9 of the shaft 7. Thereby, the primary spring-loaded latch 37 locks a fully deployed fin 3 in its fully deployed position.

More specifically with respect to the secondary locking means 43, the secondary spring-loaded latch 43 is located at a location between the aft end 11 and the fore end 9 of the shaft 7. When the sleeve bearing 13 reaches the secondary spring-loaded latch 43, the fin 3 is only partially deployed. The latch 43 is housed inside the shaft 7 and is pivoted with its pivot end 45 facing the fore end 9 of the shaft 7. The latch end 47 of the secondary latch 43 faces the aft end 11 of the shaft 7. When the sleeve bearing 13 passes over the secondary latch 43 travelling from the fore end 9 to the aft end 11 of the shaft 7, it presses the latch 43 down into the interior of the shaft 7, thereby enabling the sleeve bearing 13 to pass over the latch 43. Once the sleeve bearing 13 has cleared the spring-loaded latch 43, it will pop up out of the shaft 7 interior. In the popped up position, the latch end 47 prevents the sleeve bearing 13 from moving backward toward the fore end 9 of the shaft 7. Thereby, the secondary spring-loaded latch 43 prevents a partially deployed fin 3 from returning to a stowed position.

Means 49 for attenuating the energy of a deploying fin 3 are provided the form of a nylon bushing 49 which is located at the aft end 11 of the shaft 7. The nylon bushing 49 has a cone-like configuration and fits around the shaft 7. Teflon or other suitable plastic or soft metal materials can also be used for fabricating the bushing 49. The apex end 51 of the cone-shaped bushing 49 is of relatively small diameter and faces the fore end 9 of the shaft 7. The base end 53 of the cone-shaped bushing 49 is of larger diameter than the apex end 51 and faces the aft end 11 of the shaft 7. When the moving sleeve bearing 13 first contacts the bushing 49 at the relatively small diameter apex end 51, the bushing 49 begins to brake the motion of the sleeve bearing 13. As the sleeve bearing 13 continues to engage the bushing 49 moving from the small diameter apex end 51 to the larger diameter base end 53, the sleeve bearing 13 encounters continuously and gradually increasing braking resistance exerted by the bushing 49. A benefit of the continuously and gradually increasing braking effect of the bushing 49 on the sleeve bearing 13 is that the final moments of deployment of the fin 3 occur in a gradual manner thereby decreasing stresses experienced by the pivot 25 which connects the fin 3 to the seat back 23. The bushing 49 also prevents the fin 3 from deploying at an angle greater than 90 degrees.

The fin 3 is deployable to an angular deployment position that has an inherent relationship, in accordance with well known principles of trigonometry, with respect to the side portion 23 of the ejection seat 5 and with respect to the shaft 7. The deployment position is determined by the relative lengths of the fin lever arm 27, the shaft 7 length, and the length of the strut 15. The angular deployment of the fin 3 with respect to the side 23 of the seat 5 is preferably 90 degrees. Concomitantly, the angular deployment of the fin 3 with respect to the shaft 7 is preferably 180 degrees.

FIG. 2 shows the embodiment of FIG. 1 in a partially deployed position. In this position, the sleeve bearing 13 has partially advanced from the fore end 9 of the shaft 7 toward the aft end 11 and has cleared the secondary latch 43 but has not cleared the primary latch 37. The fin 3 has not reached a 90 degree full deployment, but the fin 3 is prevented from returning to a stowed position by the secondary latch 43.

FIG. 3 shows the embodiment of FIG. 1 in a fully deployed position. In this position, the sleeve bearing 13 has fully advanced from the fore end 9 of the shaft 7 to the aft end 11 and has cleared both the secondary latch 43 and the primary latch 37. The fin 3 is deployed a full 90 degrees. The primary latch 37 keeps the fin 3 in the fully deployed position.

FIG. 4 shows an alternate embodiment of the invention in which a straight strut 26 is used in place of the curved strut 15 shown in FIGS. 1-3. More generally, the strut 15 can be formed to different shapes to allow the fin deployment apparatus 1 of the invention to be used on various models of ejection seats and to prevent crewman interference.

Although the embodiments of the invention described thus far provide that the momentum of the seat being ejected from the aircraft is used to supply the actuating force for deploying the fin, other sources of actuation force can be used. For example, a pressurized gas contained in a gas cylinder (not shown) can be used to propel the sleeve bearing along the shaft. Thereby, no lanyard would be needed to pull the sleeve bearing along the shaft, and no pulley would be needed to guide the lanyard.

It would also be possible to replace the shaft with a hollow tube to provide an alternate track means. The hollow tube could weigh less than the shaft, and it could be used when space requirements were critical. More specifically, with a hollow tube, the movable track-following means could be a sliding element that is received in the hollow tube. By being received in the hollow tube, the internally sliding element would not take up as much space as a sleeve bearing that slides along the outside of a shaft.

It will be understood that various changes in the details, steps and arrangement of parts which have been herein described and illustrated to explain the nature of the invention, may be made by those skilled in the art within the principles and scope of the invention as expressed in the appended claims.

What is claimed is:

1. Deployment apparatus for a fin attached to an aircraft ejection seat by a pivotal connection, said apparatus comprising: means for applying a continuous deployment force to the fin during deployment, wherein said continuous deployment force means include:

a track including a fore end and an aft end, said track defining a track length, said track being connected to the ejection seat, movable means for following said track, said track following means being in sliding engagement with said track and including a split ring therein, a strut connected between the fin and said track following means, means for connecting said strut to said track following means, means for connecting said strut to the fin, said fin to strut connecting means being located at a position along the fin, said position being displaced from the seat by a distance defining a fin lever arm, said fin lever arm being rotatable around the pivotal connection between the fin and the seat, the pivotal connection serving as a fulcrum for said fin lever arm, means for continuously moving said track following means along said track, said moving means being connected to said track following means through said split ring which permits said moving means to separate from said track following means after complete fin deployment.

2. The deployment apparatus described in claim 1 wherein the fin is deployable to an angular deployment position with respect to a side portion of the ejection seat and to said track, the deployment position being determined by the relative lengths of said fin lever arm and said track length.

3. The deployment apparatus described in claim 2 wherein said angular deployment position of the fin with respect to the side of the ejection seat is substantially 90 degrees.

4. The deployment apparatus described in claim 2 wherein said angular deployment position of the fin with respect to said track is 180 degrees.

5. The deployment apparatus described in claim 1 wherein said moving means includes a lanyard, a first end of said lanyard connected to said track following means, a second end of said lanyard connected to a source of actuation force, said moving means further including means for guiding said lanyard during movement of said track following means.

6. The deployment apparatus described in claim 1 wherein said track is attached to a side of the ejection seat.

7. The deployment apparatus described in claim 1 wherein said track includes a shaft.

8. The deployment apparatus described in claim 7 wherein said track following means includes a sliding block adapted for riding along the outside of said shaft.

9. The deployment apparatus described in claim 1, further including primary locking means for locking the fin in a fully deployed position.

10. The deployment apparatus described in claim 9 wherein said primary locking means are located at the aft end of said track, said primary locking means preventing said track following means from returning to the fore end of said track.

11. The deployment apparatus described in claim 9 wherein said primary locking means include at least one spring loaded latch.

12. The deployment apparatus described in claim 1, further including means for attenuating energy located at the aft end of said track, said energy attenuation means engaging said track following means thereby stopping said track following means at the aft end of said track and preventing damage to the pivotal connection between the fin and the seat.

* * * * *